June 20, 1961 C. E. G. BAILEY 2,989,239

ANALOGUE COMPUTERS

Filed Oct. 25, 1956 3 Sheets-Sheet 1

INVENTOR
Christopher E. G. Bailey
BY
Ralph B. Stewart
ATTORNEY

June 20, 1961 C. E. G. BAILEY 2,989,239

ANALOGUE COMPUTERS

Filed Oct. 25, 1956

3 Sheets-Sheet 2

INVENTOR
Christopher E.G. Bailey
BY
Ralph B. Stewart
ATTORNEY

June 20, 1961 C. E. G. BAILEY 2,989,239

ANALOGUE COMPUTERS

Filed Oct. 25, 1956 3 Sheets-Sheet 3

INVENTOR

Christopher E. G. Bailey

BY Ralph B. Stewart

ATTORNEY

United States Patent Office 2,989,239
Patented June 20, 1961

2,989,239

ANALOGUE COMPUTERS

Christopher E. G. Bailey, London, England, assignor to The Solartron Electronic Group Limited, Thames Ditton, Surrey, England Filed Oct. 25, 1956, Ser. No. 618,292
Claims priority, application Great Britain Oct. 31, 1955
7 Claims. (Cl. 235—186)

The present invention relates to analogue computers of the kind adapted to transform co-ordinates of a point function of time from one co-ordinate system to another, mechanical or electrical variations to be transformed being applied to one or more inputs and the transformed variations being derived from one or more outputs, and in which the function to which the transformation is made has a finite number of isolated singularities within the range over which the transformation is to be effected.

One example of a transformation with which this invention is concerned is a transformation from cartesian to polar coordinates. The non-temporal co-ordinates may for example define the position, velocity or acceleration of the point function. A singularity may be either what is known as a pole in which one variable tends to plus or minus infinity at a particular value of the other variable or a branch point at which one variable has more than one value for some given value of the other variable.

A practical difficulty arising in the mechanism of computers of the kind set forth is that at, and in the vicinity of, a singularity components of the computer are called upon to operate beyond their operating limits. Since the components are incapable of so operating their operation becomes indeterminate and unreliable.

The present invention has for its object to provide means for overcoming this unreliability.

According to the present invention, there is provided a computer of the kind specified having one or more components adapted to operate over a predetermined range of values and provided with means adapted to operate automatically when one or more of the components reaches a predetermined value to interrupt the normal channel or channels of transformation between the input and output of the computer and to apply to the output during such interruption a predetermined variation, the arrangement being such that the said predetermined range is not exceeded.

Figure 1:
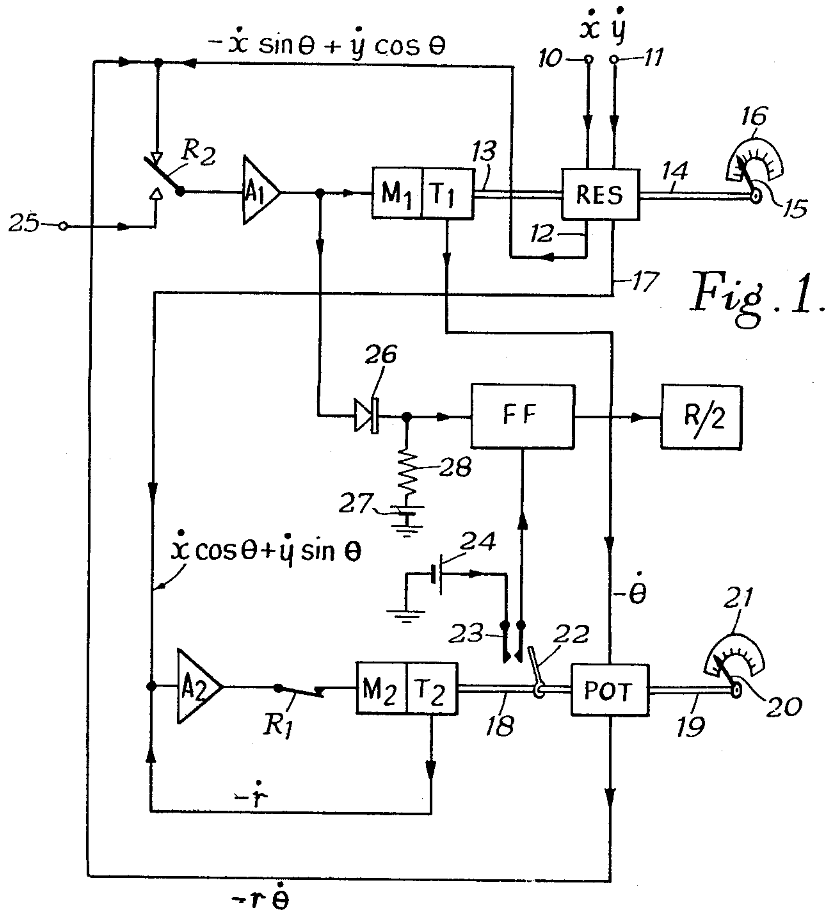
Figure 2:
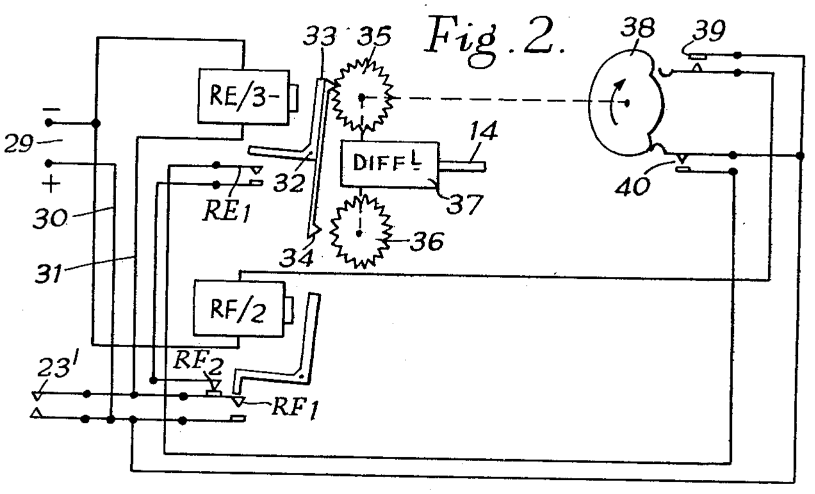
Figure 5:
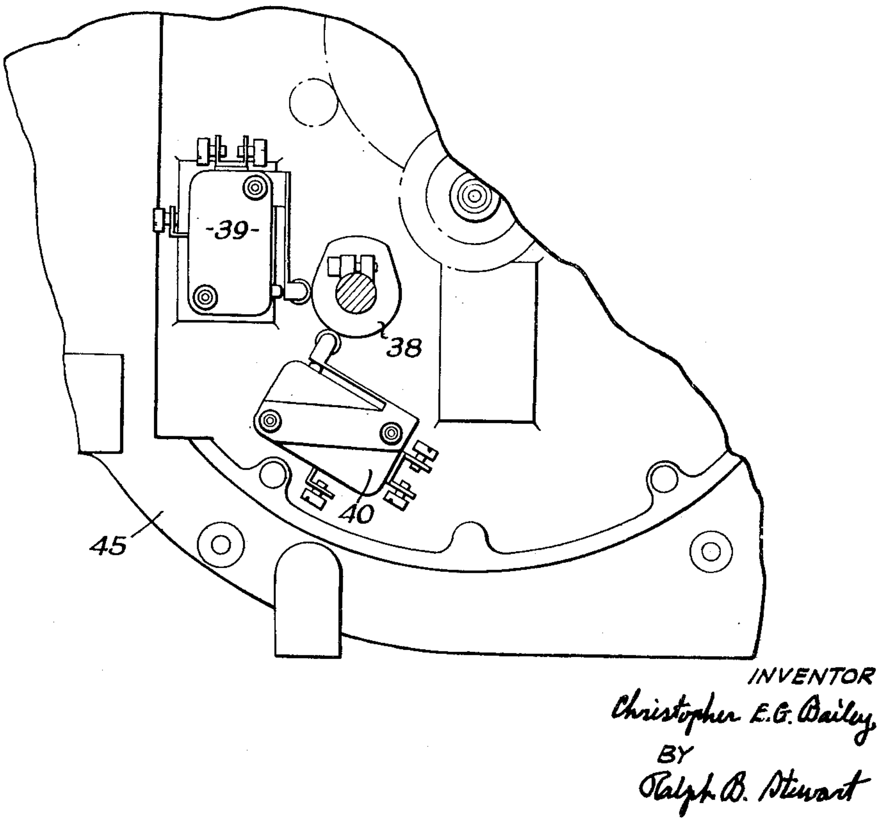
Figure 3:
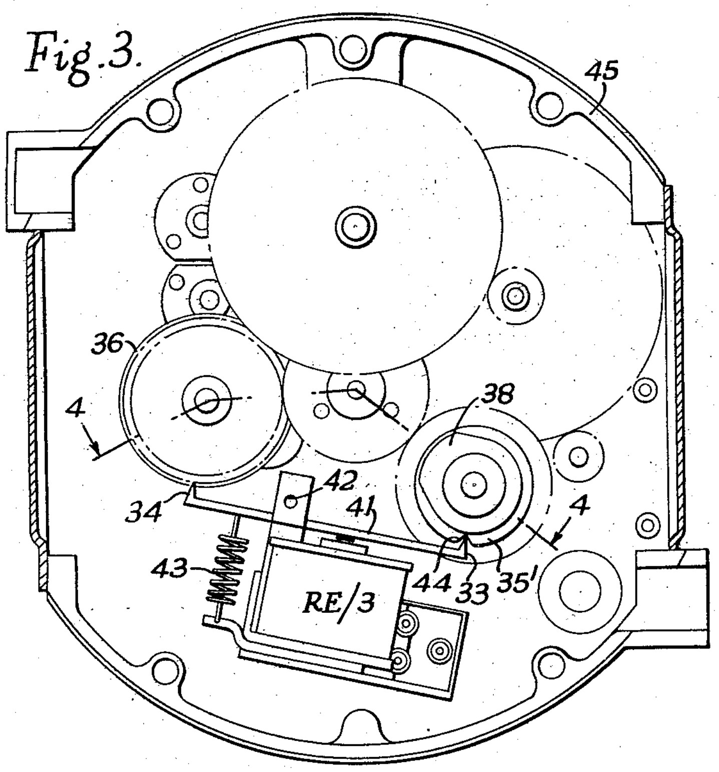
Figure 4:
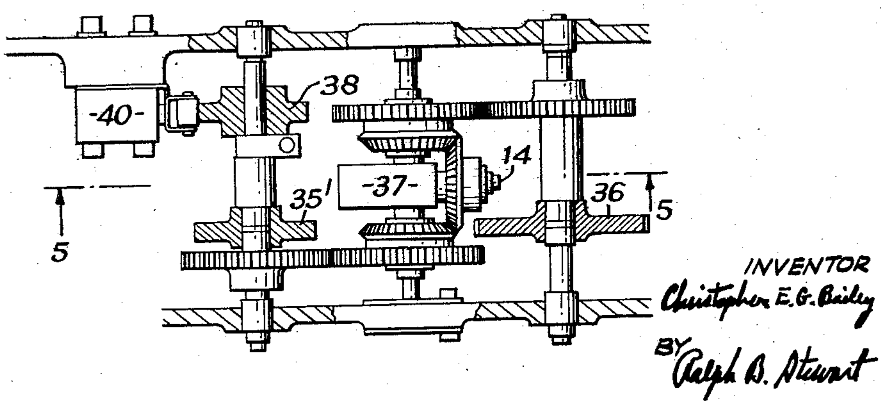

The invention will be described by way of example with reference to the accompanying drawing in which FIG. 1 is a schematic diagram of a computer for converting velocities in cartesian co-ordinates $x$ and $y$ into positions in polar co-ordinates $r$ and $\theta$, FIG. 2 is a diagram illustrating a modification of part of FIG. 1, FIG. 3 is an end view of a practical embodiment of the pawl and ratchet mechanism of FIG. 2, FIG. 4 is a view in section on the line 4—4 of FIG. 3, and FIG. 5 is a view in section on the line 5—5 in FIG. 4.

Referring to FIG. 1, electrical variations $\dot{x}$ and $\dot{y}$ representative of the $x$ and $y$ components respectively of the velocity of a point are applied at terminals 10 and 11 to a resolver RES, the nature of which will be described later. The quantities $\dot{x}$ and $\dot{y}$ may be currents or voltages but for convenience will be assumed to be voltages. One output 12 of the resolver is applied through a relay contact $R_2$ and a conventional amplifier $A_1$ to a motor-tachometer $M_1T_1$ adapted to rotate a spindle 13 to an extent dependent upon the speed of the motor $M_1$ which in turn is dependent upon the voltage applied to the motor $M_1$ from the amplifier $A_1$.

The resolver RES may for example comprise sine-cosine potentiometers and is so designed as to generate from the voltages $\dot{x}$ and $\dot{y}$ at 12 a voltage $-\dot{x}\sin\theta+\dot{y}\cos\theta$, and at 17 a voltage $\dot{x}\cos\theta+\dot{y}\sin\theta$, where $\sin\theta=x/r$ and $\cos\theta=y/r$.

The spindle 13 extends at 14 beyond the resolver RES and is shown as provided with an indicating pointer 15 co-operating with a scale 16 calibrated to indicate values of $\theta$. This is explained for instance in "Components Handbook" ed. J. F. Blackburn, McGraw Hill, 1949, pp. 264–266, and in "Electronic Analog Computers," Korn and Korn, McGraw Hill, 1952, pp. 279–287. They serve to convert impulses in accordance with the formulae given. For instance, if at any moment $\dot{x}$ and $\dot{y}$ have the values $a$ and $b$, respectively, and the sine-cosine potentiometer is set to an angle $\theta=p$, then there will be generated in lead 12 a voltage $-a\sin p+b\cos p$ and at 17 a voltage $a\cos p+b\sin p$. $\theta$ is assumed to be the angle of the pointer 15 with reference to a predetermined datum and the sine-cosine potentiometers are set up to give the voltage relationships stated. Any disparity between the E.M.F. marked $-\dot{x}\sin\theta+\dot{y}\cos\theta$ and the E.M.F. marked $r\dot{\theta}$, both of which E.M.F.'s are applied to the upper relay contact $R_2$, is applied to the amplifier $A_1$ in such a sense as to reduce this disparity to zero.

The use of the combination of an amplifier, a motor and a potentiometer to solve equations by producing a rotation of the shaft corresponding to an unknown in an equation is well known. It is, for example, explained in Korn and Korn, loc. cit., pp. 15–16; and in "Electronic Instruments," Greenwood et al., McGraw Hill, 1948, chapters 1 and 6.

The output 17 from the resolver RES having the value $\dot{x}\cos\theta+\dot{y}\sin\theta$ is applied through a conventional amplifier $A_2$ and a relay contact $R_1$ to a motor-tachometer $M_2T_2$ adapted to rotate a spindle 18 to an extent dependent upon the voltage fed to the motor $M_2$ from $A_2$. A voltage equal to $-\dot{r}$ is applied from the tachometer $T_2$ to the input of the amplifier $A_2$. The spindle 18 drives the wiper of a potentiometer POT and a continuation 19 of this spindle is provided with a pointer 20 co-operating with a scale 21 calibrated to indicate values of $r$. The reason for the rotation of the spindle 18 being $r$ is because the angular velocity of the tachometer $T_2$ is made equal to $\dot{r}$ (that is, to the rate of change of $r$ with respect to time). Any disparity between the E.M.F.'s marked $\dot{x}\cos\theta+\dot{y}\sin\theta$ and $-\dot{r}$ is applied to the amplifier $A_2$ which similarly causes the shaft 18 to accelerate or decelerate until the angular velocity $\dot{r}$ is reached. The use of a tachometer in this way is described in the foregoing references and in particular in "Electronic Instruments," pages 83 and 84.

A voltage equal to $-\dot{\theta}$ is applied from the tachometer $T_1$ to the potentiometer POT whose output $-r\dot{\theta}$ is applied through the relay contact $R_2$ to the amplifier $A_1$. $\dot{\theta}$ is, of course, the rate of change of $\theta$ with respect to time, or in other words the angular velocity. Since, as explained above, the angular position of spindle 13 is $\theta$ the voltage generated in $T_1$ will be proportional to the rate of change of $\theta$ with respect to time, namely $\dot{\theta}$. The sign of the voltage can, of course, be made positive or negative according to requirements. In this case the negative is needed. The voltage from $T_2$ is $-\dot{r}$, that is, it represents the rate of change of $r$ with respect to time. Since the deflection of the spindle 19 represents $r$ the tachometer $T_2$ will generate a voltage proportional to $\dot{r}$ and the sign can as before be selected according to requirement. In this case it is required to be negative.

The required transformation is obtained by putting $x+iy=z$ and $\log r+i\theta=w$, from which $w=\log z$, and the latter equation has a pole at 0. Thus when $r$ approaches zero radially, or nearly radially, the spindle 13, 14 is forced to travel at increasing speed, and ultimately, in the absence of the present invention, may cease to exercise control.

There is, therefore, provided on the spindle 18 a finger 22 which when approaching a position corresponding to $r=0$ closes contacts 23 which apply to a valve flip-flop FF from a source represented by a battery 24 a voltage to operate the flip-flop and thereby operate a relay R/2 having the contacts $R_1$ and $R_2$ already referred to.

Operation of the contact $R_1$ breaks the connection between the amplifier $A_2$ and the motor $M_2$ and thus causes $r$ to remain constant at the value it had immediately before the operation of the relay as determined by the engagement of the finger 22 with the contacts 23 acting as a stop. When the connection between the amplifier $A_2$ and the motor $M_2$ is broken, the elasticity of the spring contacts 23 causes these to open.

Operation of the contact $R_2$ causes a constant voltage maintained at a terminal 25 to be applied to the amplifier $A_1$, and thus causes the spindle 13, 14 to rotate at a constant speed. The requirement is that at a singularity $r$ should remain constant while $\theta$ is changed by a reasonable amount in order to by-pass the singularity. For this it is necessary to maintain $\theta$ at some finite value. If the voltage at $A_1$ were zero $\theta$ would be zero and $\theta$ would not change and the object of the invention would not be obtained.

Thus the effect of operation of the relay R/2 is to produce what may be called an "indent," namely a constant $r$ with $\theta$ changing at a uniform rate, this condition continuing for a suitable time predetermined by the flip-flop, after which the relay R/2 is released and normal computation is resumed.

As shown in the drawing provision is also made for actuating the flip-flop FF, and thereby the relay R/2, when the voltage at the output of the amplifier $A_1$ exceeds a predetermined value. This is done, in this example, by providing a connection from the output of the amplifier $A_1$ to the flip-flop through a rectifier 26. Bias applied from a source 27 through a resistor 28 determines the value of the voltage at the output of the amplifier $A_1$ at which the relay is operated.

In the example described with reference to FIG. 1, the required indent is provided by arranging that $\theta$ varies uniformly for a time determined by the flip-flop FF. In an alternative arrangement means may be provided whereby the spindle 14 maintains the relay R/2 operated while it rotates through a predetermined angle, say 180°. Such means may, for example, comprise a cam which can be coupled to the spindle 14 by a magnetic clutch energised through a further contact on the relay R/2. The cam is arranged to engage, directly or indirectly, the armature of the relay and hold the relay operated during the appropriate angle of rotation of the cam. The flip-flop FF is omitted and the relay R/2 is arranged to be operated when the contacts 23 close. Such operation causes the spindle 14 to rotate and the magnetic clutch to be energised thus rotating the cam. The cam then holds the relay operated even when the contacts 23 open.

In order that the cam may perform one complete revolution for each cycle of operation whatever the angle through which the spindle 14 is required to rotate, suitable gearing may be provided between the cam and the spindle 14. In the case where the spindle 14 is required to turn through 180° the cam will be made to rotate at twice the speed of the spindle 14.

Another means for achieving a like result is shown diagrammatically in FIG. 2. Contacts 23' are arranged to be operated by the finger 22 in FIG. 1, the relay R/2 is replaced by a relay RE/3 and the flip-flop FF is omitted. When the contacts 23' are closed the relay RE/3 is operated from a source connected at 29 through connections 30 and 31. Operation of the relay RE/3 operates contacts corresponding to $R_1$ and $R_2$ in FIG. 1, which are not shown in FIG. 2, and also the armature of the relay RE/3 which is pivoted at 32 and carries two pawls 33 and 34. When the armature is operated contacts $RE_1$ are closed, the pawl 33 disengages from a toothed wheel 35 and the pawl 34 engages a toothed wheel 36. The wheels 35 and 36 are driven through a differential gear 37 from the spindle 14 in FIG. 1. Thus when the relay RE/3 is operated, the wheel 35 is rotated at twice the speed of the spindle 14 and the wheel 36 is held stationary. The wheel 35 is directly coupled to a cam 38 co-operating with contacts 39 and 40.

Rotation of the cam 38 in the direction of the arrow thereon closes contacts 39 and thereby operates a relay RF/2, closing contacts $RF_1$ and opening contacts $RF_2$. Contacts $RF_1$ and $RF_2$ are so arranged that $RF_1$ closes before $RF_2$ opens. The contacts $RF_1$ are in parallel with 23' and maintain the relay RE/3 operated after the contacts 23' open.

Further rotation of the cam 38 closes contacts 40 which make a connection from the positive supply terminal to the upper contact $RF_2$. When, therefore, upon further rotation of the cam 38, the contacts 39 open (40 remaining closed) and the relay RF/2 releases, the relay RE/3 remains operated through lead 30 and contacts 40, $RE_1$ and $RF_2$. The cycle ends when the cam 38 returns to its starting position after 360° of rotation (corresponding to 180° rotation of the spindle 14) and the contacts 40 open releasing the relay RE/3 and locking the wheel 35 with the pawl 33.

One form that the pawl and ratchet mechanism 33, 34, 35, 36, differential 37, cam 38 with contacts 39, 40, and relay RE/3 may take is shown in FIGS. 3 to 5, wherein like parts have the same references as in FIG. 2. It is to be noted that in FIG. 4 shafts are shown as co-planar for the sake of clearness although as is clear from FIGS. 3 and 5 they are not co-planar.

The armature 41 carrying the pawls 33 and 34 is pivoted at 42 and urged by a spring 43 into the position in which the cam 38 is locked by the pawl 33 engaging in a notch 44 in a wheel 35' corresponding to the toothed wheel 35 in FIG. 3.

The mechanism referred to is mounted in a casing 45 together with other mechanism which is not relevant to the present invention and is, therefore, not described.

I claim:

1. An analogue computer for transforming co-ordinates of a point function of time from one co-ordinate system to another, comprising first and second inputs to which the variations of one co-ordinate system to be transformed are respectively applied, first and second outputs at which transformed variations are generated, first and second coordinate transformation-effecting means coupled respectively between said first input and output and said second input and output, a reference source of fixed value, and control means responsive to one of said variations exceeding a predetermined value for rendering both said transformation-effecting means inoperative and for coupling said reference source to one of said outputs.

2. A computer according to claim 1, wherein said inputs are terminals at which electrical variations are applied and said outputs comprise rotatably mounted spindles.

3. A computer according to claim 2, wherein said control means comprise an electric switch actuated by one of said spindles in a predetermined position thereof.

4. A computer according to claim 2, wherein each of said transformation-effecting means comprises an electric motor driving one of said spindles and an electric circuit connecting one of said terminals to said motor, and wherein said control means comprise switch means in said electric circuits.

5. A computer according to claim 4, wherein said reference source is a constant voltage source and wherein said switch means comprise means interrupting said electric circuits and connecting said source to one of said motors.

6. A computer according to claim 1, wherein said control means comprise timing means rendering said transformation-effecting means inoperative for a predetermined time.

7. A computer according to claim 4, wherein said control means comprise means responsive to the extent of movement of one of said spindles to render said transformation-effecting means inoperative during rotation of said one spindle through a predetermined angle.

References Cited in the file of this patent

UNITED STATES PATENTS 2,510,384 Dehmel ---------------- June 6, 1950

OTHER REFERENCES

"Application of Electronic Differential Analyzers to Engineering Problems" (Morrill). Published by Midwest Research Inst. 1953. (Pages 119 and 120 relied on.)